United States Patent
Kirchberg et al.

(10) Patent No.: US 8,064,673 B2
(45) Date of Patent: Nov. 22, 2011

(54) COMBINED SEGMENTATION AND REGISTRATION FRAMEWORK FOR PARAMETRIC SHAPES

(75) Inventors: Klaus J. Kirchberg, Princeton, NJ (US); Christoph Guetter, Lawrenceville, NJ (US)

(73) Assignee: Siemens Aktiengesellschaft, München ( * ) Notice: Subject to any disclaimer, the term of this patent is extended or adjusted under 35 U.S.C. 154(b) by 421 days.

(21) Appl. No.: 12/431,109

(22) Filed: Apr. 28, 2009

(65) Prior Publication Data
US 2010/0091035 A1 Apr. 15, 2010

Related U.S. Application Data

(60) Provisional application No. 61/105,498, filed on Oct. 15, 2008.

(51) Int. Cl.
*G06K 9/00* (2006.01)
(52) U.S. Cl. .................................................. 382/131
(58) Field of Classification Search ................... 382/131
See application file for complete search history.

(56) References Cited

U.S. PATENT DOCUMENTS
2009/0220137 A1* 9/2009 Chefd'hotel et al. ......... 382/131

OTHER PUBLICATIONS

K. Okada, X. Huang, X. Zhou, A. Krishnan, "Robust Click-Point Linking for Longitudinal Follow-Up Studies", in Proc. of $3^{rd}$ Int. Workshop of Med. Imag. and Augm. Reality, Shanghai, LNCS 4091, 2006, pp. 252-260.
Y. Rathi, O. Michailovich, J. Malcolm, and A. Tannenbaum, "Seeing the Unseen: Segmenting With Distributions", Proceedings Signal and Image Processing, 2006, Conference on Signal and Image Processing, Honolulu, Hawaii, USA.

* cited by examiner

*Primary Examiner* — Roy M Punnoose
(74) *Attorney, Agent, or Firm* — Donald B. Paschburg (57) ABSTRACT

Progress monitoring of lesions is done automatically by segmentation and registration of lesions in multi-phase medical images. A parametric level-set framework includes a model optimization for any number of lesions. The user specifies lesions in a baseline volume by clicking inside of them. The apparatus segments the lesions automatically in the baseline and follow-up volumes. The segmentation optimization compensates for lesion motion between baseline and follow-up volumes. 2D and 3D medical patient data can be processed by the methods.

20 Claims, 4 Drawing Sheets

COMBINED SEGMENTATION AND REGISTRATION FRAMEWORK FOR PARAMETRIC SHAPES

CROSS-REFERENCE TO RELATED APPLICATIONS

This application claims the benefit of U.S. Provisional Application No. 61/105,498, filed Oct. 15, 2008, which is incorporated herein by reference.

BACKGROUND OF THE INVENTION

Figure 1:
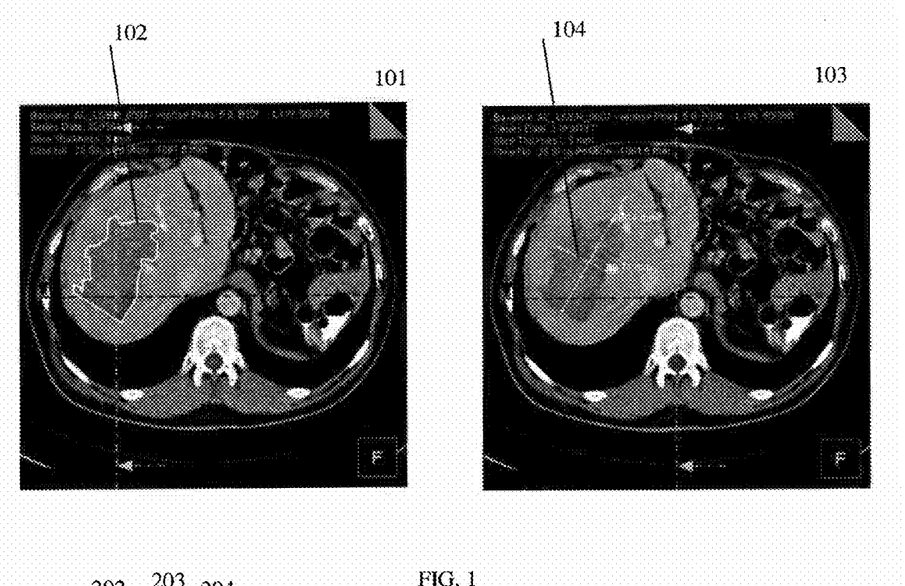
FIG. 1 shows images of a liver imaged at the venous phase of contrast enhanced CT.

The present invention relates to methods and apparatus for image segmentation and image registration. In particular, it relates to segmentation and registration of medical 2D and 3D images that are acquired at different phases and/or at different times. Imaging applications for oncology follow-up studies have just recently been introduced to the clinical workflow. Cancer treatment has also become an extraordinary important procedure in today's healthcare due to cancer being among the most frequent causes of death. Monitoring the patient's response to radiation treatment by investigating cancer development is crucial for determining success or failure of the therapy. One indicator for cancer development is the change in size and structure of lesions found in thorax and abdomen that can be imaged by contrast enhanced CT, as shown in FIG. 1 images 101 and 103. CT images are acquired by well known computed axial tomography (CAT) or computed tomography (CT) scan techniques.

Contrast-enhanced multi-phase CT refers to CT acquisitions at different phases determined by the time of contrast agent injection, i.e. native, arterial, venous, late, etc. phase. Not only the size of the lesion but also the way the contrast agent is being washed-in and washed-out in the lesion is an indicator for the stage of cancer. As each contrast phase varies dramatically in the amount of contrast agent that is visible in the image, the ability to detect and segment those lesions becomes extremely challenging in some phases for a segmentation application operating on a computer and even for the human eye. Note, that lesions are not visible in CT without contrast agent, i.e. native phase. Follow-up studies may include two consecutive CT multiphase acquisitions taken before and after treatment and usually within a 3 months time span. To this end, there may be up to 8 or more volumes, i.e. about 4 volumes per multi-phase information. Segmenting of lesions should preferably be performed in all phases of all follow-up studies.

FIG. 1 shows a contour outline 102 in image 101 and, in image 103, diameter measurement indicators 104 of a lesion in the liver imaged at the venous phase of contrast enhanced CT.

One of the challenges is heavily varying contrast between the phases. Another challenge is the apparent deformations of objects between the follow-up studies. The deformations result from tissue and organ changes due to radiation treatment, breathing motion, cancer evolvement, lesion changes, different patient position, etc. Current methods for cancer monitoring in follow-up studies focus on the segmentation part in baseline and follow-up volume and establishing lesion correspondence afterwards.

It is believed that currently there are no known methods or apparatus to model lesion segmentation and correspondence simultaneously in a combined framework. Accordingly, novel and improved methods and apparatus are required to provide simultaneous segmentation and registration of objects in different but related images.

SUMMARY OF THE INVENTION

One aspect of the present invention presents a novel method and apparatus that will provide automatic segmentation and registration of a plurality of objects in baseline and follow-up image data.

As one aspect of the present invention a method is provided for segmentation by a processor of N objects with $N \geq 2$ in a follow-up image I' corresponding to a baseline image I containing N objects corresponding to the N objects in follow-up image I', and simultaneously registering the N objects in follow-up image I' to a position of the N corresponding objects in baseline image I, an image being represented by image data, comprising, optimizing segmentation and registration of the N objects in image I' by optimizing one or more parameters defining a shape of a contour by evolving a level set function maximizing a conditional probability expression that is a function of one or more contour parameters related to each object in image I' under a condition of one or more contour parameters related to each object in image I, and generating by the processor of the follow-up image for display with segmented and registered objects identified.

As another aspect of the present invention a method is provided, wherein optimizing segmentation is achieved by adjusting a parametric level set function.

As yet another aspect of the present invention a method is provided, wherein image data is generated by CT imaging and the objects are lesions.

As yet another aspect of the present invention a method is provided, wherein the baseline image includes an image of a liver.

As yet another aspect of the present invention, a method is provided, further comprising marking each object i in image I, generating and optimizing a segmentation contour for each object i of N objects in baseline image I, the contour of each object in I being determined by one or more contour parameters $\gamma_i$, generating a contour for each object i' of N objects in image I', the contour of each object I' being determined by one or more contour parameters $\gamma_i'$, optimizing segmentation and registration of the i' of N objects in image I' by maximizing the conditional probability expression $P(\Gamma'|\Gamma,I') \propto P(I'|\Gamma,\Gamma')P(\Gamma|\Gamma')P(\Gamma')$, wherein $\Gamma=(\gamma_1, \ldots, \gamma_N)$ represents the one or more contour parameters of each of the N objects in the image I, and $\Gamma'=(\gamma'_1, \ldots, \gamma'_N)$ represents the one or more parameters of each of the N objects in image I', and generating an image for display with segmented and registered objects identified.

As yet another aspect of the present invention a method is provided, wherein the generating and optimizing a contour for an object i in baseline image I comprises optimizing the contour parameters $\gamma_i$ of the object i by maximizing the probability expression represented as $P(\gamma|x_0,I) \propto P(I|\gamma,x_0)P(x_0|\gamma)P(\gamma)$, wherein $x_0$ is a position inside the object i that was marked.

As yet another aspect of the present invention a method is provided, wherein the optimizing of the contour for an object in baseline image I comprises the steps of initializing the contour parameters of the contour with a first set of parameters $\gamma_0$, and evolving the contour by applying a gradient descent of a cost function.

As yet another aspect of the present invention a method is provided, wherein the gradient descent of a cost function C is expressed as $$\frac{\partial C}{\partial \gamma}(\gamma) = \sum_{x \in \Omega} \delta(\phi_\gamma(x))(P_{out}(I(x)) - P_{in}(I(x)))\frac{\partial \phi_\gamma}{\partial \gamma}(x)dx,$$

wherein $\delta(x)$ is a Dirac delta function, $H(z)$ is a Heaviside step function, $\phi_\gamma$ denotes a level-set function representing a shape parameterized by a parameter $\gamma$, $$P_{in}(z) = \frac{\sum_{x \in \Omega} H(\phi_\gamma(x))\delta(I(x) - z)}{\sum_{x \in \Omega} H(\phi_\gamma(x))}$$

and $$P_{out}(z) = \frac{\sum_{x \in \Omega} (1 - H(\phi_\gamma(x)))\delta(I(x) - z)}{\sum_{x \in \Omega} (1 - H(\phi_\gamma(x)))}.$$

As yet another aspect of the present invention a method is provided, wherein generating the segmentation contour for each object i of N objects in baseline image I, comprises providing a click-point $x_0^i$ to each object i of the N objects in image I to create N click-points $X_0=(x_0^1, \ldots, x_0^N)$, assigning a prior shape to each contour, parameterizing a level-set function $\phi_\gamma$ representing a shape, based on the prior shape, and maximizing a conditional probability $P(\Gamma|I, X_0)$.

As yet another aspect of the present invention a method is provided, wherein the prior shape is an ellipsoid.

As yet another aspect of the present invention a method is provided, further comprising optimizing segmentation and registration of the i' of N objects in image I' by finding a global rigid translation of all object shapes, and by letting each object translate itself locally.

As yet another aspect of the present invention a method is provided, further comprising defining the level-set function as $\phi_{\gamma_i}(x) := \phi(x, \mu_i + \Delta\mu_i + T, \Sigma_i + \Delta\Sigma_i)$ wherein $\Delta\mu_i$ denotes a displacement of object i ellipsoid's mass center, T is a global rigid translation of the N objects, each object having an ellipsoid shape, and $\Delta\Sigma_i$ describes a shape difference of object i in image I with corresponding object i' in the follow-up image I'.

Each of these methods or processes is performed on a processor. The processor may be a dedicated personal computer, a network of personal computers, a special purpose computing device or any other processing device having sufficient power to perform the requisite computing tasks. The device will preferably include memory, appropriate input/output and is programmed to perform the steps and processes specified herein.

DESCRIPTION OF A PREFERRED EMBODIMENT

Novel methods and apparatus for segmentation and registration of general shapes and objects and as applied to applications such as medical images are provided herein. The application of CT multi-phase follow-up studies is used to describe an embodiment of the general approach. Aspects of the invention are intended to cover both the model description and its application to oncology care cancer monitoring, such as in an imaging system.

The provided framework is composed in one part of a novel region based parametric level-set segmentation formulation.

In one embodiment of the present invention the problem of locating and measuring previously identified lesions in one or more follow-up images is solved. An exact registration of the datasets is not necessary; this is implicitly done by a method that will be provided next. A possible workflow could be as follows.

Figure 2:
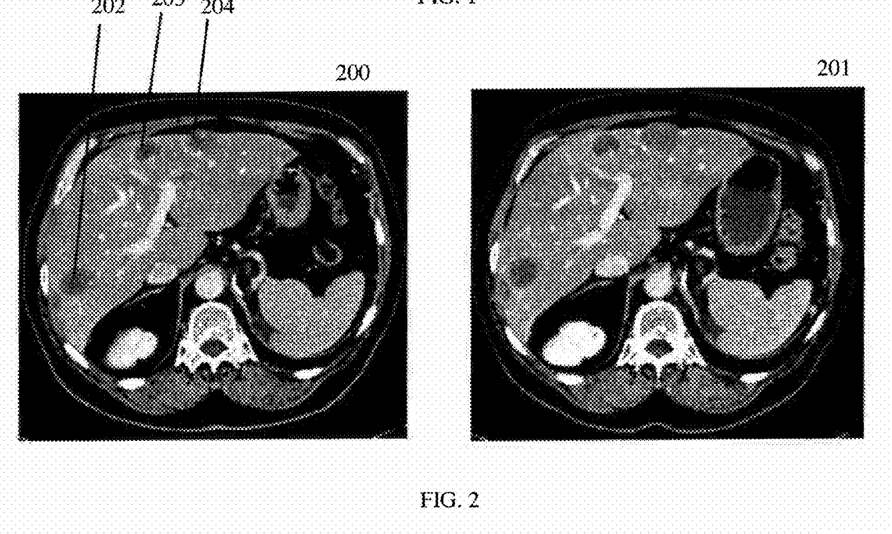
FIG. 2 provides images of a liver illustrating an initial step in accordance with an aspect of the present invention.

1. Manual initialization—Looking at one or several images of the baseline study, a user such as a physician marks the lesions of interest by clicking on them. This is illustrated in FIG. 2, wherein image 200 is a baseline image and image 201 is a follow-up image. Marks 202, 203 and 204 are the marks made by a user, and are also designated as clickpoints. The mark may be considered a seed that identifies the object.

2. Independent lesion segmentation—The process in accordance with an aspect of the present invention will then automatically segment each lesion separately, i.e. find the outline of each lesion. A segmentation method will find a boundary or contour that uses the mark as a starting point for segmentation. The object may be called object or foreground. The object has to be separated from a rest of the image, which is usually called the background. Accordingly, an image segmentation separates a foreground or object, from its background. Segmentation may take place on 2D images. It may also take place on 3D images.

An image herein, is a 2D image or a 3D image. An image is represented by image data. An image may contain pixels or voxels. A pixel or voxel is represented by data for instance and may be presented in a matrix that reflects a spatial position of a pixel or a voxel. A pixel or a voxel may represent an intensity. An intensity may be a grey level intensity. It may also be an intensity in a color vector. Pixels and voxels may also be represented by data that reflect other properties such as opacity or a density. Based on a property that a pixel or voxel represents, the image data can be rendered as an image on for instance a computer screen, applying at least one of known rendering techniques.

There are several known segmentation techniques. The novel segmentation and registration techniques provided as an aspect of the present invention, optimizes a posterior probability function. In one embodiment this is achieved by applying level set methods.

Figure 3:
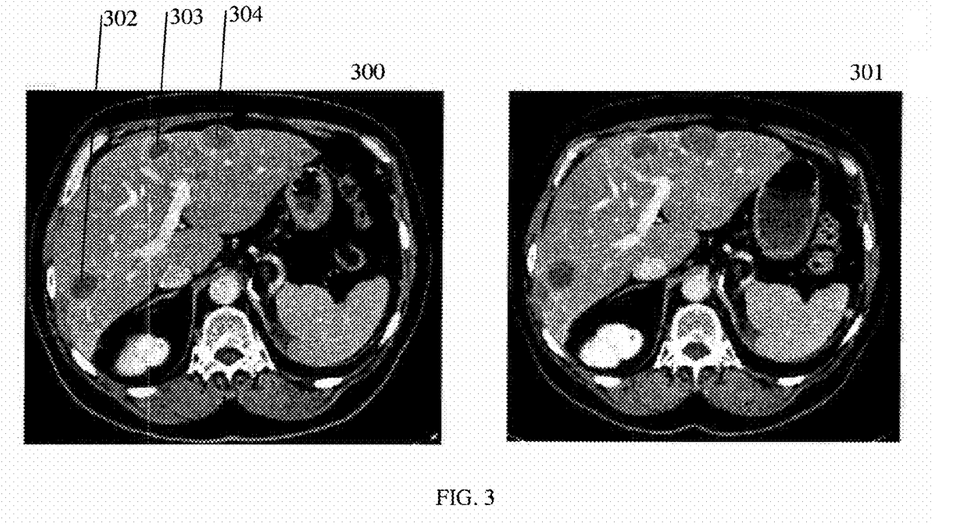
FIG. 3 provides images of a liver illustrating an independent segmentation step in accordance with an aspect of the present invention.

In the illustrated case an ellipse shape is fitted to the tumor—this can be substituted by an arbitrary boundary shape. This is shown in FIG. 3 with image 300 the baseline image and image 301 the follow-up image. Shapes 302, 303 and 304 are the ellipse shaped boundary shape generated by the automatic segmentation.

Figure 4:
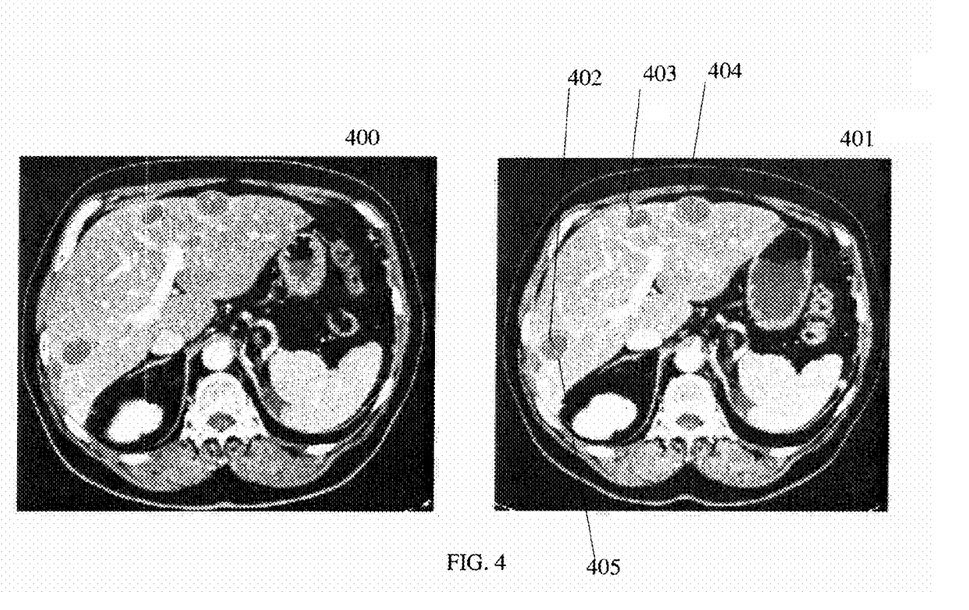
FIG. 4 provides images of a liver illustrating a segmentation and registration step in accordance with an aspect of the present invention.
Figure 5:
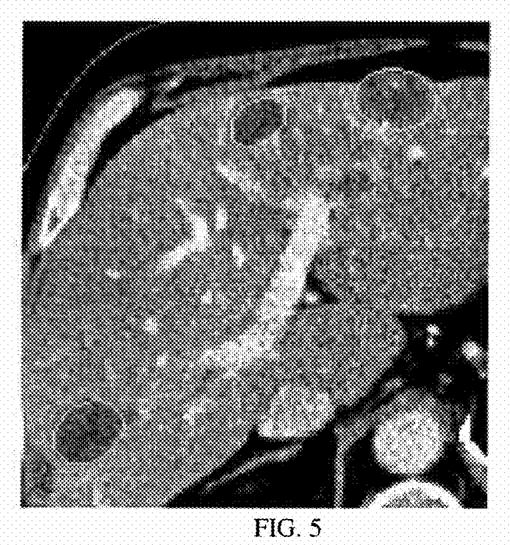
FIG. 5 provides an enlarged image of a baseline segmentation.
Figure 6:
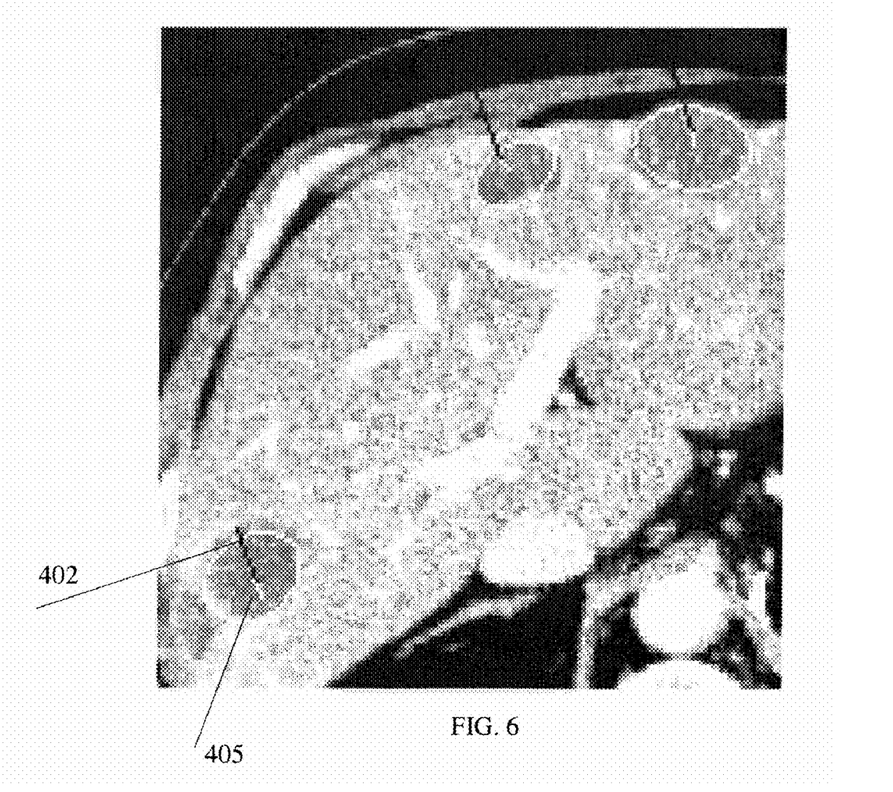
FIG. 6 provides an enlarged image of a follow-up segmentation.

3. Combined follow-up segmentation—After all the lesions are successfully segmented in the baseline image, the process in accordance with an aspect of the present invention detects them in the follow-up study. This detection step allows for changes of each tumor with respect to size, shape and location. By imposing topological constraints about their relative position, a robust segmentation is still possible. This is illustrated in FIGS. 4-6. FIG. 4 shows image 400 as a baseline image with segmentation contours and image 401 as a follow-up image. The image 401 shows a global displacement of the segmented lesions with respect to the baseline image 400. The global displacements are shown by lines 402, 403 and 404. Each individual lesion also shows a displacement which is indicated by much smaller lines such as line 405. In general one may display the images on a display such as a high resolution display screen in color to distinguish between details and highlight segmentations and displacements. These details get lost in a grey scale low resolution print such as the drawings. For illustrative purposes a portion of image 400 in FIG. 4 is shown enlarged in FIG. 5. A portion of image 401 of FIG. 4 is shown enlarged in FIG. 5, in which displacements 402 and 405 clearly identified.

Independent Lesion Segmentation

In this step, each lesion is evaluated separately. Given an image I and a position $x_0$ inside the structure (e.g. manually clicked), the contour parameters $\gamma$ are optimized by maximizing the probability $P(\gamma|x_0, I) \propto P(I|\gamma, x_0)P(x_0|\gamma)P(\gamma)$. The first term on the right hand side reflects the consistency with the image data. The second term describes the proximity to the click point, and the third one introduces prior knowledge about the shape of the lesion (e.g. by boosting compact shapes and penalizing degenerate shapes). For performance and stability reasons the calculations are restricted to a sufficiently large rectangular region of interest (ROI) of the image. The following sections show exemplary choices for the individual terms of the posterior probability function.

Consistency with Image Data

This section provides the probability expression for the contour by using a level set function as a parameter in the well known Heaviside function.

$$P(I|\gamma, x_0) = P(I|\gamma) = \exp\left[-\frac{1}{M}\sum_{x\in\Omega} H(\phi_\gamma(x))P_{out}(I(x)) + (1 - H(\phi_\gamma(x)))P_{in}(I(x))\right]$$

$$P_{in}(z) = \frac{\sum_{x\in\Omega} H(\phi_\gamma(x))\delta(I(x) - z)}{\sum_{x\in\Omega} H(\phi_\gamma(x))}$$

$$P_{out}(z) = \frac{\sum_{x\in\Omega} (1 - H(\phi_\gamma(x)))\delta(I(x) - z)}{\sum_{x\in\Omega} (1 - H(\phi_\gamma(x)))}$$

This makes use of the Heaviside function $$H(z) = \begin{cases} 1 & z > 0 \\ 0 & \text{else} \end{cases},$$

and the Dirac delta function $\delta(x)$. The $\phi_\gamma$ denotes a level-set function representing the shape parameterized by
$\phi_\gamma(x) > 0$ x inside contour $\gamma$
$\gamma: \phi_\gamma(x) = 0$ x on contour $\gamma$
$\phi_\gamma(x) < 0$ x outside contour $\gamma$
$\Omega$ is the image pixel/voxel space.
In the case of $\|\nabla\phi_\gamma\|=1$ everywhere, this is a signed distance function.

Click-point Proximity $P(x_0|\gamma) = \exp(-\alpha\|x_\gamma - x_0\|^2)$

This term assures that the detected shape is close to the click-point, wherein $x_\gamma$ denotes the contour's center of gravity and the parameter $\alpha$ some weighting factor.

Shape Prior

A priori knowledge about the shape can be introduced by the term $P(\gamma)$. Note that the framework presented herein allows for the representation of any shape and is not restricted to using a parametric shape model. However, the computational advantages of using lower-dimensional parametric shape priors are significant and can be crucial in the context of clinical applications. It will be explained below how one can use the prior knowledge that lesions can be approximated as ellipsoid shapes in the framework.

Optimization

The target function is provided by the earlier discussed probability function:

$$\hat{\gamma} = \underset{\gamma}{\operatorname{argmax}} P(\gamma | x_0, I)$$

$$= \underset{\gamma}{\operatorname{argmin}} [-\log P(I | \gamma, x_0) - \log P(x_0 | \gamma) - \log P(\gamma)]$$

The first term of the cost function to be minimized is:

$$C(\gamma) = -\log P(I | \gamma, x_0)$$
$$= \sum_{x\in\Omega} H(\phi_\gamma(x))P_{out}(I(x)) + (1 - H(\phi_\gamma(x)))P_{in}(I(x)).$$

Starting with an initial parameter set $\gamma_0$ the contour is evolved using the gradient descent $$\frac{\partial C}{\partial \gamma}(\gamma) = \sum_{x\in\Omega} \delta(\phi_\gamma(x))(P_{out}(I(x)) - P_{in}(I(x)))\frac{\partial \phi_\gamma}{\partial \gamma}(x) dx.$$

The optimization is performed individually for each click-point in the baseline image.

Combined Follow-up Segmentation

Once the lesions are segmented in the baseline image, a second optimization step identifies and segments the corresponding lesions in the follow-up image I'. The parameters of the lesion shapes in baseline and follow-up images are denoted by $\Gamma=(\gamma_1,\ldots,\gamma_N)$ and $\Gamma'=(\gamma_1',\ldots,\gamma_N')$, respectively, where N is the number of lesions. Optimization is performed by maximizing the expression:

$P(\Gamma'|\Gamma,I') \propto P(I'|\Gamma,\Gamma')P(\Gamma|\Gamma')P(\Gamma')$.

The first term on the right hand side reflects the consistency with the follow-up image data given the baseline and follow-up segmentations. The second term is two-fold in the formulation. It ensures the closeness to the shape that is defined by the baseline segmentations, and it further describes the spatial closeness between baseline and follow-up segmentations in order to define the correspondences. The third term again introduces prior knowledge about the shape of the lesions.

Consistency with (Follow-up) Image Data

This section provides the expression for the probability $P(I'|\Gamma,\Gamma')$ in the expression for optimization in terms of the earlier provided Heaviside step function with a level set function as argument:

$$P(I'|\Gamma,\Gamma') = \sum_{\gamma_i' \in \Gamma'} \exp\left[ -\frac{1}{M} \sum_{x \in \Omega} H(\phi_{\gamma_i'}(x))(I'(x) - \bar{I}_T)^2 + (1 - H(\phi_{\gamma'}(x)))(I'(x) - \bar{I}_B)^2 \right]$$

wherein $\bar{I}_T$ denotes the average tumor intensity computed from the baseline volume; $\bar{I}_B$ describes the average background intensity; and $\phi_\gamma$ is defined as above. This term reflects the consistency with the follow-up image data of the segmentations, and ensures proper registration of baseline and follow-up shape sets. The next section provides details on combined segmentation and registration.

Closeness in Space and Shape

In this section the expression for the term $P(\Gamma|\Gamma')$ in the expression for optimization is provided based on the earlier provided Heaviside step function the level set function as argument and using parameters $\alpha_1$ and $\alpha_2$.

$$P(\Gamma|\Gamma') = \ldots \exp\left( -\alpha_1 \sum_{i=1}^{N} \sum_{x \in \Omega} H(H(\phi_{\gamma_i}(x)) - H(\phi_{\gamma_i'}(x))) + H(H(\phi_{\gamma_i'}(x)) - H(\phi_{\gamma_i}(x))) \right) +$$

$$\exp\left( -\alpha_2 \sum_{i=1}^{N} (x_{\gamma_i} - x_{\gamma_i'})^2 \right)$$

This term assures two things: (a) that the shape of the follow-up segmentation resembles the shape found in the baseline segmentation, see term 1 in the above expression, and (b) that corresponding lesions in baseline and follow-up volumes are well registered, see term 2 in the above expression. In this formulation part (a) is guaranteed through pixel-wise comparison of two shapes. This registration is retrieved using a global component, i.e. for all lesions, and a local component, i.e. for each individual lesion, that is robust with respect to local registration optima. The registration optimization is described in detail below. Herein, $x_\gamma$ denotes the contour's center of gravity, $\phi_\gamma$ denotes the level-set function that represents the parameterized shape, and $\alpha_1,\alpha_2$ determine each term's influence on the optimization process.

Shape Prior

The term $P(\Gamma)$ in the expression for optimization incorporates a priori knowledge about the shape of the objects, e.g. lesions, to be segmented and is generally chosen to be the same as in the baseline case. This term will be defined below for elliptic shapes.

Approximating Lesion Shape Using an Ellipsoid

Next, the general segmentation and registration framework in the case that the objects to be segmented can be approximated by an ellipse is provided. This specialized shape representation allows for robust and very efficient segmentation and registration of CT multi-phase follow-up studies. Further, a major advantage of the earlier provided level-set framework is its capability to switch easily between parametric and non-parametric representation in case a more accurate segmentation is needed.

Generally, liver lesions that are imaged using CT contrast data are of circular or elliptic shape. An ellipsoid in 2D can be defined by 3 parameters, i.e. $\gamma = \{\gamma_p, \gamma_a, \gamma_b\}$, where $\gamma_a$ and $\gamma_b$ are the half-axes, and $\gamma_p$ denotes the rotation of the ellipsoid. The lesion ellipsoid i can then be written as $$\sum_i^{-1}(\gamma_p, \gamma_a, \gamma_b) = \begin{pmatrix} \gamma_a^2 & \gamma_p \gamma_a \gamma_b \\ \gamma_p \gamma_a \gamma_b & \gamma_b^2 \end{pmatrix}.$$

The parametric level-set function becomes $$\phi_{\gamma_i}(x) = 1 - (x - \mu_i)^T \sum_i^{-1} (x - \mu_i) \text{ with } \mu_i = \begin{pmatrix} \mu_{ix} \\ \mu_{iy} \end{pmatrix}$$

being the ellipsoid's center-of-mass of lesion i. Note that this is not necessarily a signed distance function.

Ellipsoid-shape Prior

A priori knowledge about the ellipsoid shape of lesions is introduced by the following term:

$$P(\gamma) = \exp\left( -\beta \left\| \frac{\gamma_a - \gamma_b}{\gamma_a + \gamma_b} \right\|^2 \right)$$

where $\gamma_a$ and $\gamma_b$ denote the half-axes of an ellipsoid shape. This term is designed to penalize degenerate ellipsoid shapes such that the actual segmentation is as close to circular as possible.

Independent Click-point Lesion Segmentation

The baseline lesion segmentation of N lesion shapes $\Gamma = (\gamma_1, \ldots, \gamma_N)$ is achieved by maximizing the conditional probability $P(\Gamma|I,X_0)$ given image I and N click-points $X_0 = (x_0^1, \ldots, x_0^N)$. Assuming the above introduced parameterization for the level-set function, the cost function can be written as $$C_1(\Gamma) = \sum_{i=1}^{N} \sum_{x \in \Omega} H(\phi_{\gamma_i}(x)) P_{out}(I(x)) +$$

$$(1 - H(\phi_{\gamma_i}(x))) P_{in}(I(x)) + \sum_{i=1}^{N} \alpha \|x_{\gamma_i} - x_0^i\|^2 + \sum_{i=1}^{N} \beta \left\| \frac{\gamma_a^i - \gamma_b^i}{\gamma_a^i + \gamma_b^i} \right\|^2$$

Combined Automatic Lesion Segmentation and Registration

Assuming the baseline and follow-up volumes are roughly registered, e.g. by rigid volume registration or by simply aligning its centers, the second step of the optimization scheme automatically finds the corresponding set of N lesion shapes $\Gamma' = (\gamma_1', \ldots, \gamma_N')$ in the follow-up volume and retrieves segmentation for them.

This automatic segmentation and registration step is performed by allowing for lesion shape changes between baseline and follow-up shapes, by finding a global rigid translation of all lesion shapes, and by letting each lesion itself translate locally. The parametric level-set function is now defined as:

$$\phi_{\gamma_i}(x) := \phi(x, \mu_i + \Delta\mu_i + T, \Sigma_i + \Delta\Sigma_i).$$

Herein, $\Delta\mu_i$ denotes the displacement of lesion i ellipsoid's mass center; T is the global rigid translation of the set of ellipsoid shapes; and $\Delta\Sigma_i$ describes the shape difference of lesion ellipsoid i in the follow-up volume. The complete cost function is defined as $$C_{11}(\Gamma, \Gamma') = \sum_{i=1}^{N} \sum_{x \in \Omega} H(\phi_{\gamma_i}(x))(I'(x) - \bar{I}_T)^2 +$$

$$(1 - H(\phi_{\gamma_i}(x)))(I'(x) - \bar{I}_B)^2 + \alpha \sum_{i=1}^{N} \sum_{x \in \Omega} H(H(\phi_{\gamma_i}(x)) - H(\phi_{\gamma'_i}(x))) +$$

$$H(H(\phi_{\gamma'_i}(x)) - H(\phi_{\gamma_i}(x)))) + \beta \sum_{i=1}^{N} \|\Delta \mu_i\|^2$$

wherein $\bar{I}_T$ denotes the average tumor intensity computed from the baseline volume, and $\bar{I}_B$ describes the average background intensity.

Complete Cost Function and Alternate Optimization Scheme

The conditional probability is maximized by minimizing its negative logarithm. The probabilistic formulation becomes an energy minimization problem with the complete cost function being:

$$C(\Gamma, \Gamma') = C_I(\Gamma) + C_{II}(\Gamma, \Gamma')$$

The sets $\Gamma$ and $\Gamma'$ of lesion shape parameters are computed by sequentially optimizing $C_I$ and $C_{II}$, for which expressions were provided earlier herein.

Experimental Results

The herein described aspects of the present invention have been implemented on a processor and tested on axial slices of CT contrast data in the venous phase by processing image data representing a medical image of a human liver. The visual results of the workflow as described above are depicted in the images of FIGS. 3-6. The images show two different stages during algorithm optimization: after convergence of the baseline lesion segmentation that was initialized by user click-points (202, 203 and 204 in image 200 in FIG. 2), and convergence of the simultaneous, fully-automatic, lesion segmentation and registration in the follow-up volume. The follow up image 401 has been enlarged of which part is shown in FIG. 6. The line 402 and the line 405 in the image of FIG. 6 describe the trajectory of each lesion in the follow-up volume; herein line 402 shows global movement and line 405 shows individual movement of the lesion.

The figures reveal that the segmentation and correspondence problem is solved, such that any tumor staging evaluation can be computed. The robustness of segmentation and linking of liver lesions can be observed by looking at the path each lesion traveled. Many local optima for segmentation are passed due to the robust, global solution. The invention is applied but not limited to liver lesions. It can be applied to imaging of any object worth evaluating for follow-up.

Extensions and Variations

An extension to the above framework is to add an overlap penalty to cost function $C_{II}$. This penalty is designed to prevent that any two or more lesions could map to the exact same lesion during the registration step. This scenario could happen easily in the case of lesion clusters. This term can be written as $$P_{overlap} = \exp\left(-\alpha \sum_{x \in \Omega} H(H(\phi_\gamma(x)) - 1)\right).$$

A Segmentation and Registration System

Figure 7:
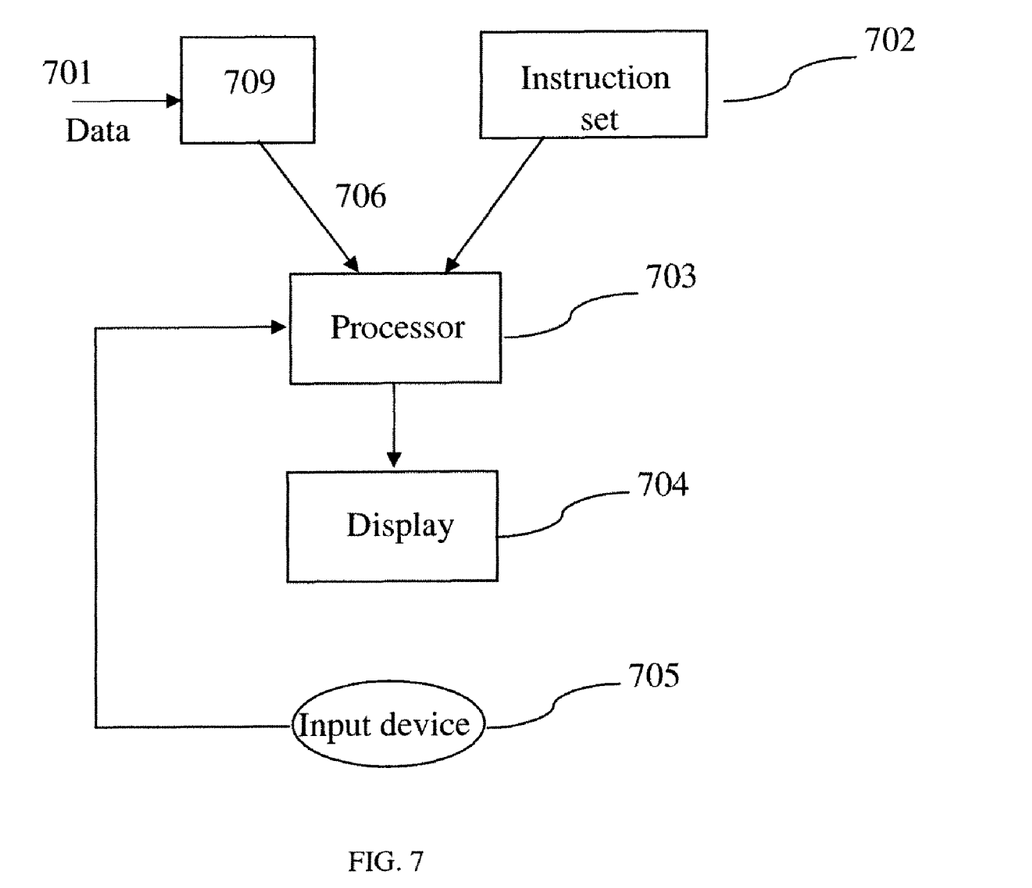
FIG. 7 illustrates a computer system for performing the steps described herein in accordance with one or more aspects of the present invention.

The image segmentation and registration methods that are provided as an aspect of the present invention can be executed by a system as shown in FIG. 7. The system is provided with data 701 representing image data. Such image data may be CT data. It may be stored in a memory 709. Image data may be provided by the memory 709 on an input 706 to a processor 703. An instruction set or program executing the methods of the present invention may be stored in an instruction memory 702, where it is available for retrieval by the processor 703 to be loaded for execution. The instruction set retrieved from 702 and loaded for execution on processor 703 may be applied to image data made available for processing by processor 703 from the memory 709. An image, such as a segmented and/or a registered image may be output to a device 704. Such a device for instance can be a display such as a computer screen. The processor can be dedicated hardware. However, the processor can also be a CPU, or a GPU or any other computing device that can execute the instructions of 702. An input device 705 like a mouse, or track-ball or other input devices may be present to allow a user to for instance place foreground and/or background seeds in an image provided for instance on the display 704 for processing by the processor. The input device may also be used to start or stop instructions on the processor. Accordingly, the system as shown in FIG. 7 provides an apparatus or a system for image segmentation and image registration by implementing and using methods disclosed herein as instructions that can be executed by the processor.

The term pixel herein also intends to cover the term voxel. Apparatus and methods provided herein apply to the segmentation, registration and processing of 2D and 3D image data.

The following references are generally descriptive of the background of the present invention and are hereby incorporated herein by reference: [1] K. Okada, X. Huang, X. Zhou, A. Krishnan, "Robust Click-Point Linking for Longitudinal Follow-Up Studies", in Proc. of $3^{rd}$ Int. Workshop of Med. Imag. and Augm. Reality, Shanghai, LNCS 4091, 2006, pp. 252-260; and [2] Y. Rathi, O. Michailovich, J. Malcolm, and A. Tannenbaum, "Seeing the Unseen: Segmenting With Distributions", Proceedings Signal and Image Processing, 2006, Conference on Signal and Image Processing, Honolulu, Hi., USA.

While there have been shown, described and pointed out fundamental novel features of the invention as applied to preferred embodiments thereof, it will be understood that various omissions and substitutions and changes in the form and details of the methods and systems illustrated and in its operation may be made by those skilled in the art without departing from the spirit of the invention. It is the intention, therefore, to be limited only as indicated by the scope of the claims appended hereto.

The invention claimed is:

1. A method for segmentation by a processor of N objects with N≧2 in a follow-up image I' corresponding to a baseline image I containing N objects corresponding to the N objects in follow-up image I', and simultaneously registering the N objects in follow-up image I' to a position of the N corresponding objects in baseline image I, an image being represented by image data, comprising:

optimizing segmentation and registration of the N objects in image I' by evolving a level set function maximizing a conditional probability expression that is a function of one or more contour parameters related to each object in image I' under a condition of one or more contour parameters related to each object in image I; and generating by the processor of the follow-up image for display with segmented and registered objects identified.

2. The method as claimed in claim 1, wherein optimizing segmentation is achieved by adjusting a parametric level set function.

3. The method as claimed in claim 1, wherein image data is generated by CT imaging and the objects are lesions.

4. The method as claimed in claim 1, wherein the baseline image includes an image of a liver.

5. The method as claimed in claim 1, further comprising:

marking each object i in image I;

generating and optimizing a segmentation contour for each object i of N objects in baseline image I, the contour of each object in I being determined by one or more contour parameters $\gamma_i$;

generating a contour for each object i' of N objects in image I', the contour of each object I' being determined by one or more contour parameters $\gamma_i'$;

optimizing segmentation and registration of the i' of N objects in image I' by maximizing the conditional probability expression:

$P(\Gamma'|\Gamma,I') \propto P(I'|\Gamma,\Gamma')P(\Gamma|\Gamma')P(\Gamma')$, wherein:

$\Gamma=(\gamma_1,\ldots,\gamma_N)$ represents the one or more contour parameters of each of the N objects in the image I; and $\Gamma'=(\gamma'_1,\ldots,\gamma'_N)$ represents the one or more parameters of each of the N objects in image I'; and generating an image for display with segmented and registered objects identified.

6. The method as claimed in claim 1, wherein the generating and optimizing a contour for an object i in baseline image I comprises:

optimizing the contour parameters $\gamma_i$ of the object i by maximizing the probability expression represented as $P(\gamma|x_0,I) \propto P(I|\gamma,x_0)P(x_0|\gamma)P(\gamma)$, wherein $x_0$ is a position inside the object i that was marked.

7. The method as claimed in claim 6, wherein the optimizing of the contour for an object in baseline image I comprises the steps of:

initializing the contour parameters of the contour with a first set of parameters $\gamma_0$; and evolving the contour by applying a gradient descent of a cost function.

8. The method as claimed in claim 7, wherein the gradient descent of a cost function C is expressed as:

$$\frac{\partial C}{\partial \gamma}(\gamma) = \sum_{x \in \Omega} \delta(\phi_\gamma(x))(P_{out}(I(x)) - P_{in}(I(x))) \frac{\partial \phi_\gamma}{\partial \gamma}(x) dx, \text{ wherein:}$$

$\delta(x)$ is a Dirac delta function;

$H(z)$ is a Heaviside step function;

$\phi_\gamma$ denotes a level-set function representing a shape parameterized by a parameter $\gamma$;

$$P_{in}(z) = \frac{\sum_{x \in \Omega} H(\phi_\gamma(x))\delta(I(x)-z)}{\sum_{x \in \Omega} H(\phi_\gamma(x))}; \text{ and}$$

$$P_{out}(z) = \frac{\sum_{x \in \Omega} (1-H(\phi_\gamma(x)))\delta(I(x)-z)}{\sum_{x \in \Omega} (1-H(\phi_\gamma(x)))}.$$

9. The method as claimed in claim 5, wherein generating the segmentation contour for each object i of N objects in baseline image I, comprises:

providing a click-point $x_0^i$ to each object i of the N objects in image I to create N click-points $X_0=(x_0^1,\ldots,x_0^N)$;

assigning a prior shape to each contour;

parameterizing a level-set function $\phi_\gamma$ representing a shape, based on the prior shape; and maximizing a conditional probability $P(\Gamma|I,X_0)$.

10. The method as claimed in claim 9, wherein the prior shape is an ellipsoid.

11. The method as claimed in claim 10, further comprising optimizing segmentation and registration of the i' of N objects in image I' by finding a global rigid translation of all object shapes, and by letting each object translate itself locally.

12. The method as claimed in claim 11, further comprising:

defining the level-set function as $\phi_{\gamma_i}(x):=\phi(x,\mu_i+\Delta\mu_i+T,\Sigma_i+\Delta\Sigma_i)$ wherein $\Delta\mu_i$ denotes a displacement of object i ellipsoid's mass center, T is a global rigid translation of the N objects, each object having an ellipsoid shape, and $\Delta\Sigma_i$ describes a shape difference of object i in image I with corresponding object i' in the follow-up image I'.

13. An apparatus for segmentation of N objects with $N \geq 2$ in a follow-up image I' corresponding to a baseline image I containing N objects corresponding to the N objects in follow-up image I', and simultaneously registering the N objects in follow-up image I' to a position of the N corresponding objects in baseline image I, an image being represented by image data, comprising:

a memory;

a processor, retrieving instructions from the memory and executing the instructions to perform the steps of:

optimizing segmentation and registration of the N objects in image I' by evolving a level set function maximizing a conditional probability expression that is a function of one or more contour parameters related to each object in image I' under a condition of one or more contour parameters related to each object in image I; and generating of the follow-up image for display with segmented and registered objects identified.

14. The apparatus as claimed in claim 13, wherein optimizing segmentation is achieved by adjusting a parametric level set function.

15. The apparatus as claimed in claim 13, wherein image data is generated by CT imaging and the objects are lesions.

16. The apparatus as claimed in claim 13, wherein the baseline image includes an image of a liver.

17. The apparatus as claimed in claim 13, further comprising instructions to perform the steps of:

marking each object i in image I;

generating and optimizing a segmentation contour for each object i of N objects in baseline image I, the contour of each object in I being determined by one or more contour parameters $\gamma_i$;

generating a contour for each object i' of N objects in image I', the contour of each object I' being determined by one or more contour parameters $\gamma'_i$;

optimizing segmentation and registration of the i' of N objects in image I' by maximizing the conditional probability expression:

$$P(\Gamma'|\Gamma,I') \propto P(I'|\Gamma,\Gamma')P(\Gamma|\Gamma')P(\Gamma'), \text{ wherein:}$$

$\Gamma=(\gamma_1,\ldots,\gamma_N)$ represents the one or more contour parameters of each of the N objects in the image I; and $\Gamma'=(\gamma'_1,\ldots,\gamma'_N)$ represents the one or more parameters of each of the N objects in image I'; and generating an image for display with segmented and registered objects identified.

18. The apparatus as claimed in claim 17, wherein generating the segmentation contour for each object i of N objects in baseline image I, comprises:

providing a click-point $x_0^i$ to each object i of the N objects in image I to create N click-points $X_0=(x_0^1,\ldots,x_0^N)$;

assigning a prior shape to each contour;

parameterizing a level-set function $\phi_\gamma$ representing a shape, based on the prior shape; and maximizing a conditional probability $P(\Gamma|I,X_0)$.

19. The apparatus as claimed in claim 18, wherein the prior shape is an ellipsoid.

20. The apparatus as claimed in claim 19, further comprising:

defining the level-set function as $\phi_{\gamma_i}(x):=\phi(x,\mu_i+\Delta\mu_i+T,\Sigma_i+\Delta\Sigma_i)$ wherein $\Delta\mu_i$ denotes a displacement of object i ellipsoid's mass center T is a global rigid translation of the N objects, each object having an ellipsoid shape, and $\Delta\Sigma_i$ describes a shape difference of object i in image I with corresponding object i' in the follow-up image I'.

* * * * *